United States Patent [19]

Segawa

[11] 3,902,194

[45] Aug. 26, 1975

[54] COVER AND/OR HOLDING APPARATUS FOR A CASSETTE-TYPE RECORDER

[75] Inventor: Yoshio Segawa, Yokohama, Japan

[73] Assignee: Sony Corporation, Tokyo, Japan

[22] Filed: Aug. 30, 1974

[21] Appl. No.: 502,060

[30] Foreign Application Priority Data

Sept. 14, 1973 Japan .............................. 48-107826

[52] U.S. Cl. ................................................. 360/137
[51] Int. Cl.$^2$ ............................................ G11B 5/00
[58] Field of Search ................ 360/137, 93, 134, 85

[56] References Cited

UNITED STATES PATENTS

| | | | |
|---|---|---|---|
| 3,620,479 | 11/1971 | Umeba | 360/93 |
| 3,669,455 | 6/1972 | Cicatelli | 360/93 |
| 3,765,685 | 10/1973 | Harlan et al. | 360/137 |

*Primary Examiner*—Vincent P. Canney
*Attorney, Agent, or Firm*—Lewis H. Eslinger; Alvin Sinderbrand

[57] ABSTRACT

Cover and/or holding apparatus for covering a recess, such as a cassette chamber, disposed in a housing, the housing having outer walls whereby the recess is accessible through an opening in an outer wall. A member is rotatably supported in the housing for covering and/or introducing a magnetic tape cassette into the recess. A pair of arms is fixed to the member, the arms being disposed in parallel planes that are substantially perpendicular to the plane of the member, the arms extending rearwardly therefrom and being insertable to the recess. A fulcrum is provided on each of the arms, each fulcrum being in physical contact with the interior surface of the outer wall to thereby define pivot points for the member with respect to such outer wall. Each of the arms further includes a portion for receiving a bias force exerted thereon by a resilient member disposed within the recess, whereby each arm is subjected to a moment about an axis of rotation. Each arm further has an arcuate surface portion which rides along a guide member disposed within the recess as such arm rotates about the axis of rotation whereby the guide members are positioned to maintain the fulcrums in contact with the interior surface of the outer wall at all times.

16 Claims, 4 Drawing Figures

PATENTED AUG 26 1975

3,902,194

COVER AND/OR HOLDING APPARATUS FOR A CASSETTE-TYPE RECORDER

BACKGROUND OF THE INVENTION

This invention relates to cover and/or holding apparatus for covering a recess and, in particular, to such apparatus for use with a cassette-type recorder wherein a magnetic tape cassette is received and operably positioned with respect to such recorder. In one embodiment thereof, the cassette holder serves to receive a tape cassette and to cover a cassette chamber disposed within the recorder housing.

Cassette-type recorder apparatus is known wherein a cassette chamber disposed within the recorder housing receives a magnetic tape cassette introduced thereto by a cassette holder. Such cassette holder is adapted to be exposed externally of such housing so that an operator can conveniently insert a magnetic tape cassette thereinto. In some prior art recorders, the cassette holder simultaneously serves to receive and hold a magnetic tape cassette to be operated upon by the recorder apparatus and to cover the cassette chamber when the magnetic tape cassette is properly positioned therein. In other recorder apparatus a separate cover is provided, independent of the cassette holder.

An attendant disadvantage of many of such prior art cassette-type recorder apparatus is that the cassette holder is of relatively complicated construction resulting in a higher cost of manufacture and requiring careful maintenance. In addition, such cassette holder and/or cover is difficult to assemble to or disassemble from the housing of the recorder apparatus.

OBJECTS OF THE INVENTION

Therefore, it is an object of the present invention to provide an improved cover and/or holder apparatus for use in a cassette-type recorder.

It is another object of this invention to provide a cassette holder for a cassette-type recorder which is of relatively simple construction and can be easily assembled to or disassembled from the recorder housing.

It is another object of the present invention to provide an improved cassette holder which enables an operator to easily insert and withdraw magnetic tape cassettes.

A still further object of this invention is to provide an improved cassette holder which additionally serves as a cover for a cassette chamber of a cassette-type recorder.

Yet another object of this invention is to provide a cassette holder and/or cover for a cassette-type recorder which is constructed of a minimum number of parts, thereby facilitating maintenance thereof when necessary.

An additional object of the present invention is to provide an improved cover admitting of simple construction and which can be easily manufactured.

Various other objects and advantages of the present invention will become apparent from the forthcoming description and the novel features will be particularly pointed out in the appended claims.

SUMMARY OF THE INVENTION

In accordance with the present invention, cassette holder apparatus is provided for receiving and operably positioning a magnetic tape cassette in a recorder/playback device and which additionally acts as a cover for a cassette chamber of such device, the apparatus comprising a rotatable member supported in the recorder housing for receiving the magnetic tape cassette and/or for covering the cassette chamber; a pair of spaced apart arms coupled to the rotatable member and disposed in parallel planes that are substantially perpendicular to the plane of the member, the arms extending beyond the boundary defined by such member and being insertable into the cassette chamber; a fulcrum provided on each of the arms, each fulcrum being in physical contact with the interior surface of an outer wall of the recorder housing to thereby define pivot points for the rotatable member with respect to such outer wall; each arm further including a portion for receiving a bias force exerted thereon by a resilient member disposed within the cassette chamber, whereby each arm is subjected to a moment about an axis of rotation; and wherein each arm further has an arcuate surface portion adapted to ride along a guide member positioned within the cassette chamber so as to guide the rotatable member during its rotation and to maintain such rotatable member in proper alignment whereby the fulcrums on each arm are maintained in contact with the housing wall notwithstanding the bias force exerted on the arms.

BRIEF DESCRIPTION OF THE DRAWINGS

The ensuing detailed description of a preferred embodiment will best be understood in conjunction with the accompanying drawings in which.

DETAILED DESCRIPTION OF A CERTAIN PREFERRED EMBODIMENT

Figure 1:
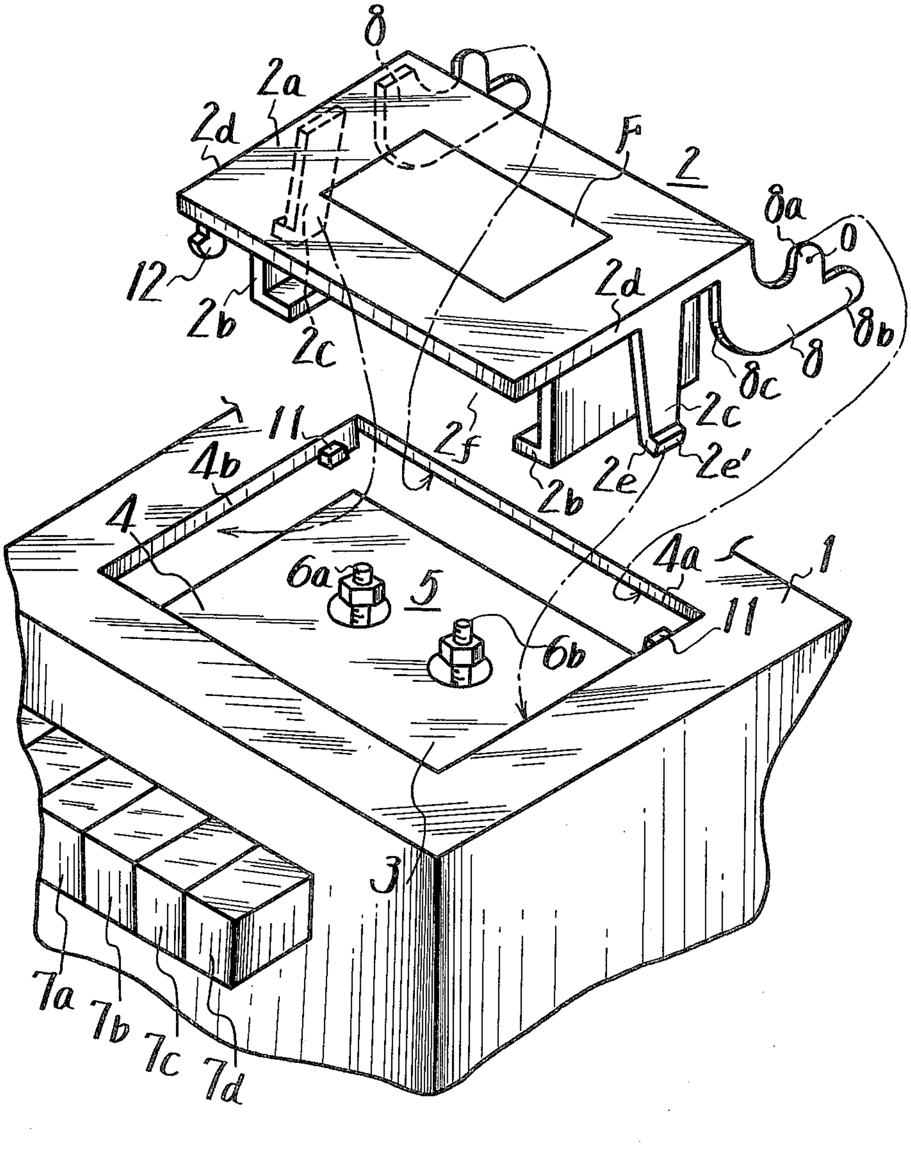
FIG. 1 is an exploded perspective view of one embodiment of the cover and/or holding apparatus of the present invention.

Referring now to the drawings, wherein like reference numerals are used throughout, there is illustrated a cover apparatus which is readily adapted for use in a cassette-type recorder, the cover apparatus finding application as both a cover for a recess, such as a cassette chamber, disposed in the recorder housing and, additionally, as a cassette holder to receive and properly position a magntetic tape cassette with respect to such recorder. It is, of course, apparent that the present invention need not be limited solely to those applications in connection with cassette-type recording/playback apparatus. However, in the interest of brevity and to facilitate a ready understanding thereof, the present invention will be described in the environment of such cassette-type apparatus.

As depicted in the drawings, such recorder/playback apparatus includes a housing 1 formed of outer walls and wherein one of such outer walls is provided with an opening or window 4 to permit access to a recess 3 in such housing, the recess preferably comprising a cassette chamber. Within such cassette chamber are drive shafts **6*a* and 6*b*** which project upward through a chassis surface 5 to thereby engage with the hubs of tape supply and take-up reels of a conventional magnetic tape cassette (not shown). As is recognized, such drive shafts 6a and 6b function to drive the tape between such supply and take-up reels within the cassette. To permit operation of the recorder/playback device, various operating buttons 7a, 7b, 7c, and 7d are provided. Typical operations controlled by the actuation of such buttons result in recording, playback, rewinding and fast forward drive of the tape. Additionally, one of such buttons, such as button 7a, functions as an eject control to enable a magnetic tape cassette positioned within the cassette chamber to be removed therefrom.

Reference numeral 2 identifies a cassette holder which serves to receive and properly position a magnetic tape cassette and, additionally, serves as a lid or cover for the cassette chamber 3. Such holder and/or cover includes a plate member 2a which acts as a cassette holder support and, also, as the lid for closing the cassette chamber. The plate member 2a is conveniently provided with a viewing window F at its center portion through which an operator can observe the cassette held therebeneath so as to be apprised of various operating characteristics.

The cassette holding appartus further includes a pair of clamp arms 2b, 2b which are spaced apart and which depend from the plate member 2a. Such clamp arms are L-shaped and serve as a passageway through which a magnetic tape cassette is inserted. The bent portions of such L-shaped clamp arms also serve to support the tape cassette in proper alignment. Such alignment permits an operator to observe the tape cassette through the window F and, additionally, to enable the drive shafts 6a and 6b to engage the hubs of the tape supply and take-up reels. Also, the proper alignment of the tape cassette by the clamp arms enables the capstan to be inserted into the cassette and permits various recording, playback, and erase heads to be operably positioned with respect to the tape.

As illustrated, a pair of spaced apart arms 8 are coupled to the plate member 2a. In one embodiment, the arms are formed integrally with the plate member and are disposed in parallel planes that are substantially perpendicular to the plane of the plate member. These arms are shown as depending from the plate member and, additionally, extend rearwardly beyond the boundary defined by the plate member 2a. As shown, the arms 8 may be provided at the opposite side edges of the plate member 2a and are adjacent the rear edge of such plate member. The arms are adapted to be inserted into the cassette chamber during assembly of the holder/cover. Each arm is provided with a fulcrum portion 8a, each fulcrum portion being in physical contact with the interior surface of the outer wall 1 of the recorder housing. The fulcrum portions are formed as protuberances projecting from each arm, the surface of each protuberance being arcuate, such as semicircular, whereby an axis of rotation 0 for the arm is provided in each protuberance. Each arm 8 additionally is provided with a portion 8b for a purpose soon to be described. As shown, such portion 8b comprises a horizontal projection terminating as a rounded ear. Each arm further includes an arcuate surface portion 8c having a radius of curvature R about the axis of rotation 0.

Figures 2, 3, 4:
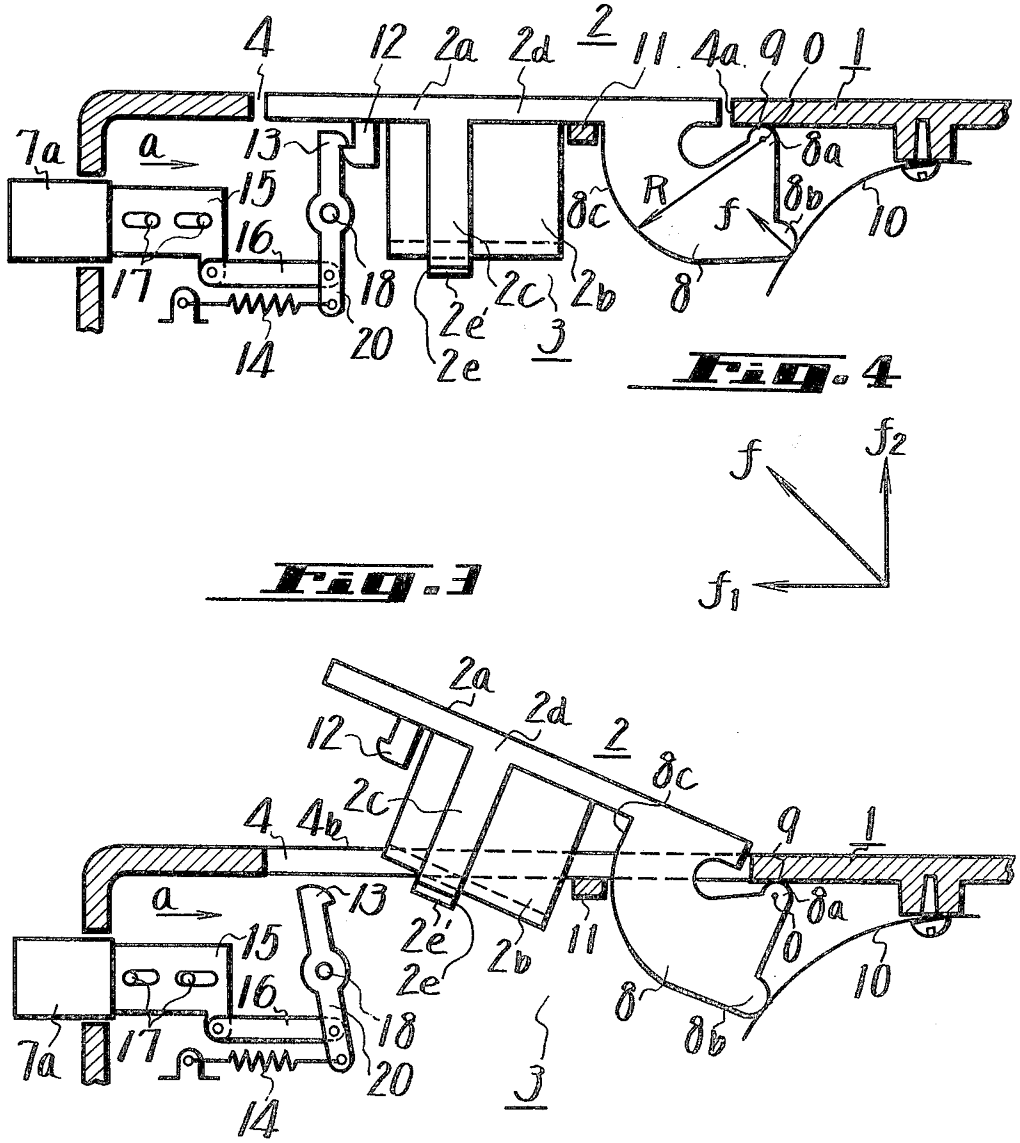
FIG. 2 is a side view in partial cross-section depicting the embodiment shown in FIG. 1 when the cover and/or holding apparatus is closed and/or loaded.
FIG. 3 is a side view in partial cross-section depicting the embodiment of FIG. 1 when the cover and/or holding apparatus is opened and/or unloaded.
FIG. 4 depicts a vector diagram which is helpful in explaining the operation of a portion of the apparatus illustrated in FIGS. 2 and 3.

As depicted in greater detail in FIGS. 2 and 3, the interior surface of the outer wall of the recorder housing 1, proximate the edge 4a of the window 4, is provided with portions 9. These portions are in physical contact with the fulcrum protuberances 8e of each arm when such arms are inserted into the cassette chamber and the cassette holder/cover is operably positioned therein. In addition, a leaf spring 10 is affixed to the housing, as by a suitable securing member, such as a screw, the leaf spring being adapted to be contacted by the portion 8b of the arms 8. It is appreciated that such leaf spring is adapted to exert a spring bias force on the arm contact portions 8b when such arm is properly positioned with respect to the cassette chamber and is placed in contact with such leaf spring. The leaf spring may comprise a single spring member extending across the length of the cassette chamber or, alternatively, the leaf spring may be formed of a pair of spring members juxtaposed with respect to the pair of arms 8. Further description of such leaf spring and its function is set forth below.

A pair of guide members 11, such as a pair of bosses, are provided within the cassette chamber and are adapted to contact the arcuate surface portions 8c of the arms 8. Such guide members are fixed to the outer wall of the recorder housing 1 and project into the cassette chamber. It is appreciated that such guide members may be integrally formed with the housing wall and, as illustrated, project perpendicular to the side edges 4b of the housing window 4. Such guide members are positioned in the vacinity of the window edge 4a for a purpose soon to be described. The arcuate surface portions 8c of the arms 8 are adapted to ride along the respective guide members as the arms rotate about the axis of rotation 0, as when the cassette holder/cover is closed and opened (loaded and unloaded).

Preferably, the window 4 diposed in the recorder housing 1 is of a substantially rectangular shape to accommodate magnetic tape cassettes and to minimize the space required therefore. The plate member 2a forming the cover of the cassette holder 2 is seen to fit within the window 4 so as to cover the cassette chamber, thus acting as a lid when a magnetic tape cassette is received by the cassette holder 2 and is operably positioned within the recorder/playback device.

A pair of depending legs 2c are connected to the plate member 2a. In one embodiment, the depending legs 2c are formed integrally with the plate member. As illustrated, the depending legs are spaced apart, preferably at the opposite side edges of the plate member, and each includes a projecting lip portion 2a along the length thereof. Such projecting lip portions function as stop members and are disposed at the remote, free end of the legs 2c. As is appreciated, each leg, taken in combination with the stop member is substantially L-shaped. The legs 2c are relatively resilient and may be formed of resilient material or, alternatively, the coupling between such legs and the plate member 2a itself may be resilient. Consequently, the legs 2c are adapted to be urged toward each other in response to a force exerted thereon. The side faces 2e' of the respective lip portions, 2e are oblique so as to form an acute angle with the side edges 2d of the plate member 2a. As will soon become apparent, such oblique side faces 2e' are adapted to contact the window edges 4b when the holder/cover 2 is assembled to the recorder housing 1. A force exerted on such oblique side faces by the window edges 4b as the holder/cover 2 is initially forced into the cassette chamber causes the depending legs 2c to be driven toward each other. However, during quiescent conditions, i.e., when no force is exerted on the depending legs, the distance between the lip portions 2*e* is greater than the window edge 4*a* which separates the side edges 4*b*. In this manner, once the holder/-cover 2 is properly positioned in the cassette chamber 3, the lip portions 2*e* will abut the interior surface of the outer wall of the recorder housing 1 to thus function as stop members whereby the plate member 2*a* can be opened no greater than a predetermined amount.

As will soon be described, the biasing force exerted by the leaf spring member 10 on the portions 8*b* of the arms 8 tends to rotate the arms, and thus the holder/-cover 2 about the axis of rotation 0. To maintain the holder/cover 2 in its closed position with respect to the cassette chamber 3, a locking mechanism is provided. In one embodiment of such locking mechanism, a hook member 12, such as an engaging hook, extends downward from the plate member 2*a* so as to extend into the cassette chamber when the plate member is rotated to cover such chamber. A cooperating lock engaging member 13, such as a lock claw is provided within the cassette chamber to engage the hook member 12 for maintaining the holder/cover in a closed (loaded) position, thus overcoming the bias force exerted by the leaf spring member 10.

As shown in FIGS. 2 and 3, the lock engaging member 13 is adapted to be selectively operated in accordance with the actuation of an eject button 7*a*. In particular, the eject button is mechanically coupled to an arm 15 which extends through the recorder housing in the direction of the arrow *a*. The arm 15 is provided with longitudinal slots through which fixed members or pins 17 extend. These members serve to guide the arm 15 in its bidirectional movement. A lever 16 is rotatably supported at the free end of the arm. As illustrated, the arm 15 may be relatively L-shaped and the lever 16 may be rotatably supported at the bent portion of the arm. An engaging lever 20 terminates in the lock engaging member 13 and is rotatably supported at its center by a fixed pin 18. The engaging lever 20 is pivotally coupled to the lever 16 so as to be rotated in the clockwise or counterclockwise direction about the fixed pin 18 as the lever 16 is moved, under the action of the arm 15, in a direction opposite to that depicted by the arrow *a* or in the direction of the arrow *a*, respectively. Additionally, a spring 14 extends between a fixed reference and the end of the engaging lever 20 which is remote from the lock engaging member 13 to thereby normally bias the engaging lever in the clockwise direction. As is illustrated, both the hook member 12 and the lock engaging member 13 are provided with camed surfaces so that when the holder/cover 2 is closed, these camed surfaces ride over each other to thereby rotate the engaging lever 20 in its counterclockwise direction, overcoming the spring bias force exerted thereon by the spring 14. Once these camed surfaces are no longer in contact, it is appreciated that the engaging lever 20 is permitted to rotate in the clockwise direction, under the influence of the spring bias force exerted thereon by the spring 14, to now engage the hook member 12 so as to maintain the holder/-cover 2 in its closed (loaded) position whereby the tape cassette (not shown) loaded therein is operably positioned with respect to the recorder processing elements. It is further appreciated that the engagement of the lock engaging member 13 with the hook member 12 sufficiently overcomes the spring bias exerted on the arm portions 8*b* by the leaf spring member 20.

Now, when the holder/cover 2 is to be rotated to an open position so that a magnetic tape cassette can be received by the holder apparatus, or so that the cassette chamber can be exposed, the eject button 7*a* is operated. This serves to move the arm 15 in the direction of the arrow *a*, whereby the lever 16 rotates the engaging lever 20 in the counterclockwise direction about the fixed pin 18. Consequently, the lock engaging member 13 releases the hook member 12 to effectively unlock the holder/cover 2 from its previous position. When unlocked, the bias force exerted on the portions 8*b* of the arms 8 by the leaf spring member 10 drives the arms 8, together with the holder/cover 2 to rotate about the axis of rotation 0, as will be described in greater detail hereinbelow.

When the holder/cover 2 is assembled to the recorder housing 1, the arms 8 are inserted into the cassette chamber 3 and are directed to the rear portion of such chamber. The holder/cover is inserted into the chamber at and angle inclined to the plane of the window 4 to facilitate the entry of the arms 8 into the cassette chamber and beneath the portions 9 of the interior surface of the outer wall of the housing 1. As the holder/cover 2 is thus inserted, the oblique faces 2*e'* on the lip portions 2*e* of the legs 2*c* are positioned into contact with the side edges 4*b* of the window 4. The oblique faces 2*e'* are tapered so that, as the holder/-cover is continued to be inserted into the cassette chamber, the side edges 4*b* drive the depending legs 2*c* toward each other. This distortion of the legs continues until the lip portions 2*e* pass beneath the side edges 4*b* of the window 4. When this condition obtains, the resiliency of the legs 2*c* drive such legs in an outward direction to now position the lip portions beneath the interior surface of the outer wall of the recorder housing 1 adjacent the side edges 4*b*. As shown in FIGS. 2 and 3, when the holder/cover is positioned within the cassette chamber, the protuberances 8*a* forming the fulcrums on the arms 8 are placed in contact with the portions 9 of the interior surface of the outer wall of the housing 1. At the same time, the portions 8*b* of the arms 8 are driven into contact with the leaf spring member 10 whereby the aforenoted spring bias force is exerted thereagainst. It is, of course, appreciated that the lip portions 2*e* of the depending legs 2*c* now abut the interior surface of the housing 1 to maintain the holder/-cover 2 in the position depicted in FIG. 3. This illustrated position corresponds to the open or unloaded position whereby the cassette chamber 3 is now exposed and the cassette holder apparatus is adapted to receive a magnetic tape cassette.

Now, if the holder/cover 2 is urged downward, that is, in the counterclockwise direction as viewed in FIGS. 2 and 3, to thereby cover the cassette chamber so as to position a tape cassette loaded into the holder apparatus, for example, the arcuate surface portions 8*c* of the arms 8 contact the guide members 11 and ride along such guide members as the holder/cover is closed. Consequently, the guide members are effective to maintain the fulcrum portions 8*a* in contact with the portions 9 on the interior surface of the housing 1 and to maintain the axis of rotation 0 at its illustrated position to permit the stable rotation of the holder/cover 2. In addition, the cooperation between the guide members 11, the fulcrums 8*a* and the arm portions 8*b* is such that the holder/cover can be rotated until the lower surface of the plate member 2*a* abuts the guide members 11. When this position is attained, the window 4 of the housing 1 is covered by the plate member as illustrated in FIG. 2. When the holder/cover is thus closed, a magnetic tape cassette positioned in the holder apparatus 2*b*, 2*b* is operably loaded such that the drive shafts 6*a* and 6*b* of the recorder engage the hubs of the supply and take-up reels of the cassette. Also, the lock engaging member 13 engages the hook member 12 so as to maintain the holder/cover 2 in the position illustrated in FIG. 2, whereby the various recording, playback, fast forward and rewind operations, normally performed by the recorder apparatus, can be effected.

As is fully appreciated, if the cassette loaded in the holder/cover 2 is to be removed and, for example, replaced with a different cassette, the eject button 7*a* is operated. As described above, the operation of this eject button serves to release the hook member 12 so that the biasing force $f$ exerted on the arm portions 8*b* by the leaf spring member 10 rotates the holder/cover in the clockwise direction about the axis of rotation 0. In this manner, the front portion of the holder/cover is raised above the housing 1, as shown in FIG. 3, to enable an operator to remove and/or insert a magnetic tape cassette thereinto.

It is apparent, from the configurations shown in FIGS. 2 and 3, that the biasing force $f$ exerted upon the arm portions 8*b* by the leaf spring member 10 provides a moment about the axis of rotation 0. Consequently, this biasing force $f$ can be divided into horizontal and vertical components $f_1$ and $f_2$, respectively, as depicted in FIG. 4. The horizontal component $f_1$ tends to translate the arm 8 and, consequently, the holder/cover 2 so that the fulcrum portion 8*a* is displaced from the portion 9 on the housing 1. However, the arcuate surface portion 8*c* is restrained by the guide member 11 and, moreover, rides along such guide member, as noted above. Hence, the horizontal component of the biasing force $f_1$ acts to rotate the holder/cover 2 as aforedescribed. Of course, the lip portions 2*a* provided on the legs 2*c* function as stop elements when the holder/cover is rotated to the position whereby such lip portions abut the interior surface of the housing 1. When this position is reached, as shown in FIG. 3, the passageway 2*f* of the holder apparatus is exposed externally of the housing window 4 — whereby a magnetic tape cassette can be removed from or inserted into the holder apparatus via the passageway 2*f*.

Although the present invention has been described with reference to a certain preferred embodiment thereof, it is readily apparent that various changes and modifications in form and details can be made. For example, the present invention need not be limited solely to those applications wherein a magnetic tape cassette is used. It is apparent that the plate member 2*a* can readily serve as a cover for any convenient recess disposed in a general housing, not necessarily a recorder-type housing. Similarly, although the illustrated embodiment conveniently acts as a combination cover and cassette holder, it should be appreciated that the principles disclosed herein can be used merely for a cassette-type holder in the absence of a cover. In that event, the plate member 2*a* may serve merely as a support structure or frame for the illustrated cassette holding apparatus or, alternatively, may be omitted. The clamp arms 2*b* may be provided with alternative frame structure which is adapted to be provided with the arms 8 and the depending legs 2*c*, as described above. It should therefore be understood that the term "holder/cover" as used hereinabove, is intended to refer to merely a cover for a recess disposed in a housing, for cassette holding apparatus to be used to receive and operably position a magnetic tape cassette and for a combination of cassette holding apparatus and a cover or lid which can be used to cover a cassette chamber in a cassette-type recorder. Therefore, it is intended that the appended claims include the foregoing and various other changes and modifications.

What is claimed is:

1. Apparatus for covering a recess disposed in a housing, the housing having outer walls wherein said recess is accessible through an opening in an outer wall, said apparatus comprising:

a plate member rotatably supported in said housing for covering said recess;

a pair of spaced apart arms coupled to said plate member and disposed in parallel planes that are substantially perpendicular to the plane of said plate member, said arms extending beyond the boundary defined by said plate member;

a fulcrum provided on each of said arms, each fulcrum being in physical contact with the interior surface of said outer wall to thereby define pivot points for said plate member with respect to said outer wall;

means disposed within said recess for exerting a bias force;

each of said arms including a portion for contacting said means and for receiving said bias force, whereby each of said arms is subjected to a moment about an axis of rotation;

each of said arms having an arcuate surface portion with a radius of curvature established at said axis of rotation; and guide members disposed within said recess for contacting said arcuate surface portion of each of said arms, whereby said arcuate surface portion rides along a guide member as said arm rotates about said axis of rotation, said guide members being positioned to maintain said fulcrums in contact with said interior surface of said outer wall while said bias force is exerted on said arms.

2. Apparatus in accordance with claim 1 wherein each fulcrum includes an arcuate surface on a protuberance projecting from said arm, said axis of rotation being provided in said protuberance.

3. Apparatus in accordance with claim 1 wherein said means for exerting a bias force comprises resilient means for exerting spring bias forces on said portions of said arms in contact therewith to rotatably urge said plate member in a direction whereby said recess is exposed.

4. Apparatus in accordance with claim 3 wherein said portions, of said arms in contact with said resilient means each comprises an ear having a rounded contacting surface.

5. Apparatus in accordance with claim 3 further including a pair of legs depending from said plate member, said pair of legs being spaced apart and each including a projecting lip portion along the length thereof for contacting the interior surface of said outer wall when said plate member rotates a predetermined amount so as to restrain further rotation of said plate member.

6. Apparatus in accordance with claim 5 wherein said plate member further includes locking means and said housing is provided with a lock engaging member cooperable with said locking means to overcome said bias force and maintain said plate member in covering relation with respect to said recess.

7. Apparatus in accordance with claim 1 wherein said arms disposed at opposite side edges of said plate member and depend therefrom, said arms extending rearwardly of said plate member.

8. Apparatus in accordance with claim 1 wherein said plate member includes cassette holding means connected thereto for receiving and holding a magnetic tape cassette and for positioning same in said recess.

9. Cassette holder apparatus for receiving and operably positioning a magnetic tape cassette in a recorder/playback device, the recorder/playback device having a housing formed of outer walls and a cassette chamber accessible through an opening in an outer wall and in which said cassette is positioned; said cassette holder apparatus comprising:

a cassette holding member for receiving a magnetic tape cassette, said cassette holding member being rotatably supported in said housing for introducing said magnetic tape cassette into said cassette chamber and for removing said magnetic tape cassette therefrom;

a pair of arms fixed to said cassette holding member, said arms being disposed at opposite side portions of said cassette holding member and extending rearwardly therefrom, said arms being insertable into said cassette chamber;

a fulcrum comprised of a protuberance projecting from each arm, the surface of said protuberance being in physical contact with the interior surface of said outer wall to thereby define an axis of rotation for said arm in said protuberance;

resilient means disposed within said cassette chamber for exerting a bias force;

each of said arms including a portion for contacting said resilient means and for receiving said bias force, whereby each of said arms is subjected to a moment about said axis of rotation;

each of said arms having an arcuate surface portion; and guide means disposed within said cassette chamber contacting said arcuate surface portion of each of said arms, whereby said arcuate surface portions ride along said guide means as said arms rotate about said axis of rotation, said guide means being positioned to maintain said protuberances in contact with said interior surface of said outer wall while said bias force is exerted on said arms.

10. Apparatus in accordance with claim 9 wherein said guide means comprises a pair of bosses projecting into said cassette chamber from said outer wall.

11. Apparatus in accordance with claim 9 further including a pair of legs depending from said cassette holding member so as to extend into said cassette chamber, said pair of legs being spaced apart and each including a stop member for contacting the interior surface of said outer wall when said cassette holding member rotates a predetermined amount so as to restrain further rotation thereof.

12. Apparatus in accordance with claim 9 wherein each of said arms is substantially L-shaped and wherein said arcuate surface portion thereof is provided at the outer portion of the elbow of said L-shape.

13. Apparatus in accordance with claim 12 wherein said portions of said arms in contact with said resilient means each comprises an ear on the free end of said L-shape, said ear having a rounded contacting surface.

14. Apparatus in accordance with claim 9 wherein said cassette holding member comprises a plate member having a window therein said plate member being rotatable to cover said cassette chamber; and a cassette receiving passageway depending from said plate member for receiving and holding a magnetic tape cassette.

15. Apparatus in accordance with claim 14 wherein each of said arms is integral with said plate member, said arms being disposed at opposite side edges of said plate member and depending into said cassette chamber with said plate member is rotated to cover said cassette chamber, each of said arms being substantially L-shaped, and wherein said arcuate surface portion thereof is provided at the outer portion of the elbow of said L-shape.

16. Apparatus in accordance with claim 14 wherein said plate member includes a hook member which extends into said cassette chamber when said plate member is rotated to cover said chamber; and wherein said housing includes a lock claw member engageable with said hook member when said plate member is rotated to cover said chamber so as to overcome the bias force exerted by said resilient means and to maintain said plate member in covering relation with respect to said chamber.

* * * * *